(12) United States Patent
Donaldson et al.

(10) Patent No.: US 9,604,412 B2
(45) Date of Patent: Mar. 28, 2017

(54) DIGITAL MANUFACTURING SYSTEM FOR PRINTING THREE-DIMENSIONAL OBJECTS ON A ROTATING SURFACE

(71) Applicant: Xerox Corporation, Norwalk, CT (US)

(72) Inventors: Patricia J. Donaldson, Pittsford, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 800 days.

(21) Appl. No.: 13/940,383

(22) Filed: Jul. 12, 2013

(65) Prior Publication Data

US 2015/0017271 A1    Jan. 15, 2015

(51) Int. Cl.
*B29C 67/00* (2006.01)
*B41J 2/125* (2006.01)
(Continued)

(52) U.S. Cl.
CPC ...... *B29C 67/0092* (2013.01); *B29C 67/0059* (2013.01); *B29C 67/0077* (2013.01);
(Continued)

(58) Field of Classification Search
CPC ............ B29C 67/0059; B29C 67/0088; B29C 67/0092; B29C 67/04; B29C 67/0077;
(Continued)

(56) References Cited

U.S. PATENT DOCUMENTS 5,059,359 A   10/1991  Hull et al.
5,137,662 A    8/1992  Hull et al.
(Continued)

FOREIGN PATENT DOCUMENTS

JP        08138998 A  *  5/1996

OTHER PUBLICATIONS

Hauser et al.; Spiral Growth Manufacturing (SGM)—A Continuous Additive Manufacturing Technology for Processing Metal Powder by Selective Laser Melting; University of Liverpool; UK EPSRC funded project reference No. GR/599013/01; 2005; 12 Pages.
(Continued)

*Primary Examiner* — Yogendra Gupta
*Assistant Examiner* — Ninh Le
(74) *Attorney, Agent, or Firm* — Maginot Moore & Beck LLP

(57) ABSTRACT

A printer forms a three-dimensional object on a rotating substrate. The printer includes a first driver to rotate the substrate past at least one printhead at a predetermined velocity and a controller to operate the printhead to eject material onto the substrate to form the object. A second driver is operated to move the position of the printhead perpendicular to the substrate to maintain a predetermined gap between the printhead and the layer of material most distant from the substrate. The second driver is further operable to move the position of the printhead parallel to the substrate to adjust a resolution of the ejected material. The controller interpolates an alternating signal generated from a position encoder to adjust the operation of the printhead based on the rotational position and velocity of the substrate.

15 Claims, 5 Drawing Sheets

(51) Int. Cl.
*B41J 2/495* (2006.01)
*B41J 3/407* (2006.01)
*B22F 3/105* (2006.01)

(52) U.S. Cl.
CPC .......... *B29C 67/0088* (2013.01); *B41J 2/125* (2013.01); *B41J 2/495* (2013.01); *B41J 3/4073* (2013.01); *B22F 2003/1057* (2013.01)

(58) Field of Classification Search
CPC ..... B29C 41/085; B29C 41/04; B29C 41/042; B29C 41/045; B29C 41/047; B29C 41/52; B22F 2003/1057; B22F 2003/1058; B22F 2003/1056; B41J 3/4073; B41J 2/125; B41J 2/495; B33Y 50/02; B33Y 30/00; G05B 19/4099
See application file for complete search history.

(56) References Cited

U.S. PATENT DOCUMENTS

| | | | |
|---|---|---|---|
| 5,184,307 A | 2/1993 | Hull et al. | |
| 5,237,521 A * | 8/1993 | Raj | G01P 3/489 377/18 |
| 5,308,725 A * | 5/1994 | Yu | G03G 15/754 198/845 |
| 5,345,391 A | 9/1994 | Hull et al. | |
| 5,617,911 A | 4/1997 | Sterett et al. | |
| 5,870,307 A | 2/1999 | Hull et al. | |
| 6,245,475 B1 * | 6/2001 | Scharfe | G03G 5/043 427/424 |
| 6,264,873 B1 | 7/2001 | Gigl et al. | |
| 6,600,965 B1 | 7/2003 | Hull et al. | |
| 7,132,125 B2 * | 11/2006 | Hammond | B05C 5/0254 118/107 |
| 7,261,542 B2 | 8/2007 | Hickerson et al. | |
| 7,550,518 B2 | 6/2009 | Bredt et al. | |
| 2003/0067097 A1 * | 4/2003 | Yu | B29C 71/0072 264/345 |
| 2007/0172749 A1 * | 7/2007 | Carmichael | G03G 5/047 430/58.8 |
| 2011/0024024 A1 * | 2/2011 | Pietrantoni | B29D 29/06 156/137 |
| 2011/0316931 A1 | 12/2011 | Silverbrook | |

OTHER PUBLICATIONS

Sachs et al.; Toward Manufacturing of Fine Components by 3D Printing; University of Texas, SFF Symposium; 2000; pp. 191-199.

Hauser et al.; Image Transformations and Printing of Plaster Layers in Spiral Growth Manufacturing; University of Texas, SFF Symposium; 2007; pp. 147-158.

Hauser et al.; Rotational 3D Printing of Sensor Devices Using Reactive Ink Chemistries; University of Texas, SFF Symposium; 2008; pp. 309-320.

* cited by examiner

US 9,604,412 B2

DIGITAL MANUFACTURING SYSTEM FOR PRINTING THREE-DIMENSIONAL OBJECTS ON A ROTATING SURFACE

TECHNICAL FIELD

The device disclosed in this document relates to three-dimensional printers generally and, more particularly, to devices for generating three-dimensional objects on moving surfaces.

BACKGROUND

Digital three-dimensional manufacturing, also known as digital additive manufacturing, is a process of making a three-dimensional solid object of virtually any shape from a digital model. Three-dimensional printing is achieved using an additive process in which successive layers of material are formed on a substrate in different shapes. Three-dimensional printing is distinguishable from traditional object-forming techniques, which mostly rely on the removal of material from a work piece by a subtractive process, such as cutting or drilling.

Existing three-dimensional systems, however, use production techniques that are slow and generate significant waste. The state of the art systems use a flat staging area onto which a single, scanning printhead slowly deposits layers of material to form the object. The printhead is typically substantially smaller than the stage and must be scanned back and forth across the stage multiple times to form each layer of the object. The scanning motion is analogous to the manner in which a home inkjet printer operates and imposes severe constraints on the speed at which the three-dimensional printer can produce an object. Improvements to three-dimensional printers that eliminate the need to scan the printhead across the stage to form the object are desirable.

SUMMARY

A first embodiment of a device for generating a three-dimensional object has been developed. The first embodiment of the device includes a hollow member having a wall, a first printhead mounted within the hollow member to enable the printhead to eject material onto an inner surface of the wall, a first driver operatively connected to the hollow member to rotate the wall of the hollow member about the printhead, and a controller operatively connected to the first printhead and the first driver, the controller being configured to operate the first driver to rotate the hollow member and to operate the first printhead to eject material onto the inner surface of the wall and build layers of material on the wall as the wall rotates about the first printhead.

A second embodiment of a device for generating a three-dimensional object has been developed. The second embodiment of the device includes a circular member having an outer diameter, a printhead mounted within the outer diameter of the circular member to enable the printhead to eject material onto a surface of the circular member, a driver operatively connected to the circular member to rotate the circular member and move the surface past the printhead, a second driver operatively connected to the printhead to move the printhead relative to the surface of the circular member, and a controller operatively connected to the printhead, the driver, and the second driver, the controller being configured to operate the driver to rotate the circular member, operate the printhead to eject material onto the moving surface of the circular member and build layers of material on the surface as circular member rotates, and operate the second driver to move the printhead from a first position to a second position.

BRIEF DESCRIPTION OF THE DRAWINGS

The foregoing aspects and other features of a device that generates a three-dimensional object are explained in the following description, taken in connection with the accompanying drawings.

DETAILED DESCRIPTION

Figure 1:
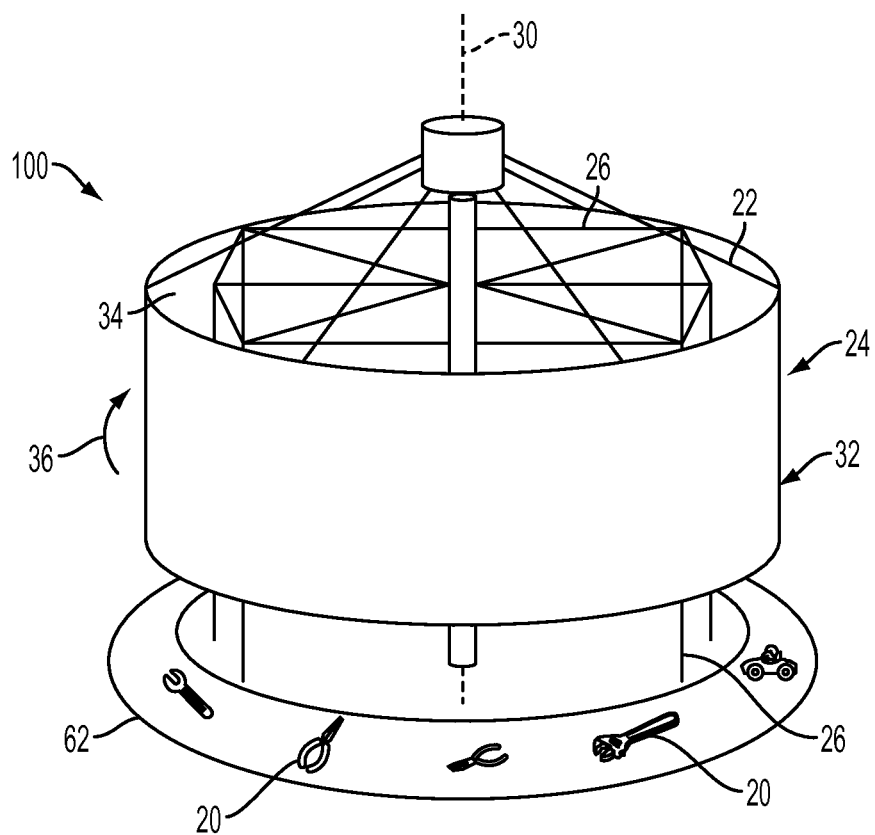
FIG. 1 is a perspective view of a first embodiment of a printer for generating a three-dimensional object.

For a general understanding of the environment for the device disclosed herein as well as the details for the device, reference is made to the drawings. In the drawings, like reference numerals designate like elements.

Figure 2:
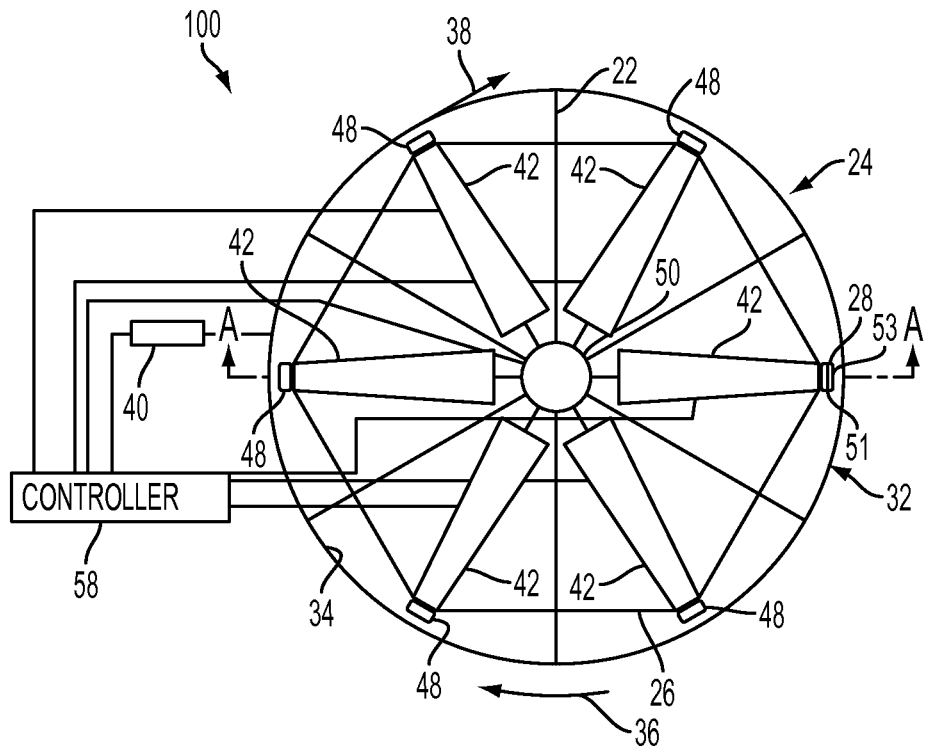
FIG. 2 is a top view of the printer of FIG. 1 illustrating an orientation of a rotating substrate and at least one printhead with respect to an axis of rotation of the substrate.

FIG. 1 and FIG. 2 show a first embodiment of a printer 100 for generating a three-dimensional object 20. The printer 100 includes an outer frame 22 configured to support a rotatable hollow member 24 and an inner frame 26 configured to support a first printhead 28 (FIG. 2) within the hollow member 24. The outer frame 22 is further configured to enable the hollow member 24 to rotate relative to the inner frame 26 about an axis 30. The hollow member 24 has at least one wall 32 that forms a continuous inner surface 34 or substrate that surrounds the axis 30. A rotation of the hollow member 24 about the axis 30 (in the direction of arrow 36) causes a portion of the inner surface 34 of the wall 32 to move past the first printhead 28 in a process direction 38 (FIG. 2). The placement of the first printhead 28 within the hollow member 24 enables the first printhead 28 to eject material onto the inner surface 34 of the wall 32 in a direction generally away from the axis 30. As used herein, the term "process direction" refers to a direction that is in the same direction as the tangential surface velocity of any position on the inner surface 34 of the wall 32 when the hollow member 24 is rotated about the axis 30.

The printer 100 further includes a first driver 40 operatively connected to the hollow member 24 and a second driver 42 operatively connected to the first printhead 28. The first driver 40 is configured to rotate the wall 32 of the hollow member 24 about the first printhead 28. In one embodiment the first driver 40 is an electromechanical motor configured to rotate the hollow member 24 via one or more motor-driven gears. In another embodiment, the first driver 40 is a magnetic drive system configured to rotate the hollow member 24 by generating a moving magnetic field. In a further embodiment, the first driver 40 is a pneumatic or hydraulic system configured to rotate the hollow member 24 by generating a pressure differential in pressure medium.

The second driver 42 is configured to move the position of the first printhead 28 relative to the wall 32 of the hollow member 24. In one embodiment, the second driver 42 moves the first printhead 28 in a direction that is parallel with the inner surface 34 of the wall 32. In some embodiments, the second driver 42 moves the first printhead 28 in a cross-process direction 44 (FIG. 3) across a width of the inner surface 34 of the wall 32. As used herein, the term "cross-process direction" refers to a direction that is perpendicular to the process direction 38 and in the plane of wall 32.

In another embodiment, the second driver 42 moves the first printhead 28 in a z-direction 46 that is perpendicular to the inner surface 34 of the wall 32. In some embodiments, the z-direction 46 is perpendicular to the axis 30. In other embodiments, the z-direction 46 is oblique to the axis 30. The movement of the first printhead 28 in the z-direction 46 enables the first printhead 28 to maintain a constant distance or gap away from the layer of ejected material most distant from the inner surface 34 of the hollow member 24. The orientation of the z-direction 46 and the inner surface 34 of the wall 32 with respect to the axis 30 is discussed in more detail below.

The first printhead 28 in one embodiment is a full-width printhead that is capable of ejecting material across the full width of the hollow member 24 in the cross-process direction 44. In another embodiment, the printer 100 includes one or more additional full-width printheads 48 mounted within the hollow member 24 to enable each of the additional printheads 48 to eject material onto the wall 32 as the inner surface 34 rotates past each printhead. The first printhead 28 and the additional printheads 48 in this embodiment are spaced from one another in a circumferential direction defined by the rotation of the hollow member 24. The multiple lines of printheads 28, 48 formed by the circumferential spacing enable the printheads 28, 48 to form three-dimensional objects at faster process speeds and to eject one or more different types of material with varying properties, such as color, conductivity, etc. The ejection of different types of material from the multiple lines of printheads 28, 48 enables the printer 100 to form complex parts by ejecting the various types of material on the same or different layers to build the three-dimensional object.

The first printhead 28 in another embodiment is a partial-width printhead capable of ejecting material across a portion of the width of the hollow member 24 in the cross-process direction 44. The first printhead 28 in this embodiment is translated parallel to the inner surface 34 in the cross-process direction 44 to enable the first printhead 28 to eject material across the width of the hollow member 24. In some embodiments, the translation of the first printhead 28 in the cross-process direction 44 enables the printer to form multiple discrete or contiguous perpendicular rings on the inner surface 34 of the hollow member 24. In other embodiments, the translation of the first printhead 28 in the cross-process direction 44 enables the printer 100 to form a spiral or barber pole pattern on the inner surface 34 of the hollow member 24. In another embodiment in which the first printhead 28 is a partial-width printhead, the printer 100 includes one or more additional partial-width printheads 48 mounted within the hollow member 24 and positioned adjacent to the first printhead 28. The printheads 48 are arranged to eject material seamlessly across the full width of the hollow member 24 in the cross-process direction 44. The printer 100 can include one or more lines of partial-width printheads 28, 48 or one or more lines of full-width printheads 28, 48 spaced in the circumferential direction to eject the same or different types of material from the respective lines of printheads 28, 48.

In one embodiment, the printer 100 has at least one multi-channel printhead that enables the printer 100 to eject one or more different types of materials from the multi-channel printhead onto the hollow member 24. The multi-channel printhead in one embodiment is configured to eject one or more of a polylactic acid (PLA) material, a nylon material, an acrylonitrile butadiene styrene (ABS) material, and metal particles from a first channel onto the inner surface 34 of the hollow member 24. The multi-channel printhead is further configured to eject a removable support scaffold from a second channel onto the hollow member 24 or onto one or more layers of material ejected onto the hollow member 24. The ejected support scaffold in one embodiment is removable by one or more subtractive processes, including, but not limited to, abrading, cutting, and grinding. In another embodiment, the ejected support scaffold is removable via a chemical or thermal dissolution process.

The printer 100 further includes a monitoring system for determining the cumulative position and the periodic average velocity of the hollow member 24 as the first driver 40 rotates the hollow member 24 about the axis 30. The monitoring system includes a position encoder 50 operatively connected to the hollow member 24. The encoder 50 is configured to generate a series of periodic signals indicative of an angular position of an index mark of the hollow member 24 as the index mark rotates about the axis 30. The monitoring system also includes a high frequency clock configured to generate clock pulses at a frequency greater than the maximum frequency of the encoder signal, and a timer for controlling the total time of a predetermined sample interval. The monitoring system also includes a counter for accumulating the number of integral encoder signal cycles completed and an arithmetic logic unit configured to determine the size of a fractional portion of an encoder signal cycle completed between the last integral encoder cycle and the end of the sample interval.

The rotational velocity of the hollow member 24 is determined by computing the sum of the number of integral encoder signal cycles and any fractional portion of an encoder cycle and dividing the sum by the predetermined sample interval. The cumulative position of the hollow member 24 is determined by multiplying the sum of the number of integral encoder signal cycles and any fractional portion of an encoder cycle by an encoder position conversion factor. In some embodiments, a lookup correction calibration is added to the encoder signals to compensate for repeatable cyclic eccentricities due to imperfections of the hollow member 24 or known calculable variations due to the construction of the object. Further details of the system for determining the cumulative position and the periodic average velocity of a rotating body are found in U.S. Pat. No. 5,237,521 to Raj et al., the disclosure of which is herein totally incorporated by reference in its entirety.

Figure 3:
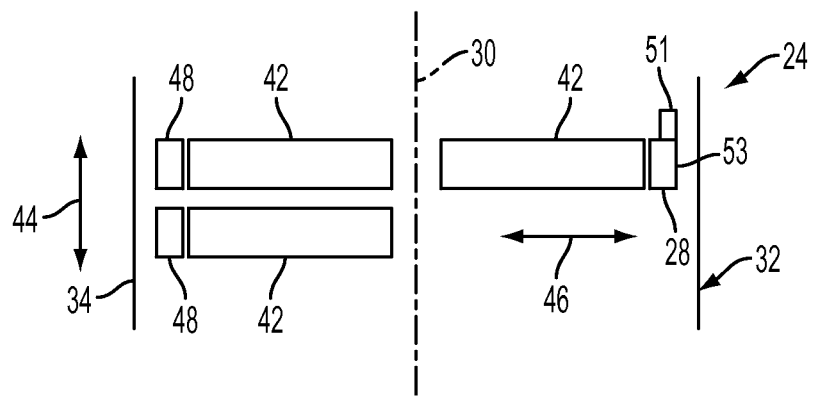
FIG. 3 is a partial section cut of the printer of FIG. 2 along line A-A showing an orientation of a rotating substrate and at least one printhead with respect to an axis of rotation of the substrate.

FIG. 3 shows a partial section cut of the first embodiment of the printer 100 of FIG. 2 along line A-A to illustrate the orientation of the wall 32 of the hollow member 24 with respect to the axis 30. For purposes of this disclosure, the relative orientation "vertical" refers to an orientation generally parallel with the side edges of the drawing sheet and the relative orientation "horizontal" refers to an orientation generally parallel with the top and bottom edges of the drawing sheet. A vertical orientation as used herein is substantially parallel with the direction in which gravity acts on an object.

The wall 32 of the hollow member 24 in the first embodiment of the printer 100 is parallel with the axis 30. Although the axis 30 of the hollow member 24 is shown vertically aligned in FIG. 3, other orientations of the axis 30 are possible, such as a horizontal orientation or an orientation between the horizontal and vertical orientations. Although FIG. 3 shows the printer 100 with one partial-width printhead 28 to the right of the axis 30 and two cross-process-spaced, partial-width printheads 48 to the left of the axis 30, the printer 100 can include any number and combination of partial-width and full-width printheads to form the three-dimensional object. The printing of a three-dimensional object using the first embodiment of the printer 100 involves a balancing of the gravitational forces acting on the ejected material and the reaction forces resulting from the rotation of the material ejected onto the inner surface 34 of the hollow member 24. The balancing of the gravitational forces and the reaction forces is discussed in more detail below.

Referring to FIG. 2 and FIG. 3, the printer 100 in one embodiment further includes at least one gap sensor 51 configured to generate a signal corresponding to a distance across a gap between the sensor 51 and the layer of ejected material most distant from the inner surface 34 of the hollow member 24. The sensor 51 in the embodiment shown in the figures is positioned flush with a print-side surface 53 of the first printhead 28 such that the signal generated by the sensor 51 corresponds to a distance across the gap between the first printhead 28 and the layer of material most distant from the inner surface 34. The sensor 51 in another embodiment is spaced a known distance from the print-side surface 53 of the printhead. This arrangement enables the distance across the gap between the first printhead 28 and the layer of material most distant from the inner surface 34 to be determined from the signal generated by the sensor 51 and the known spacing of the sensor 51 from the print-side surface 53. The gap sensor 51 in some embodiments is a contact sensor and in other embodiments is non-contact sensor.

Figure 4:
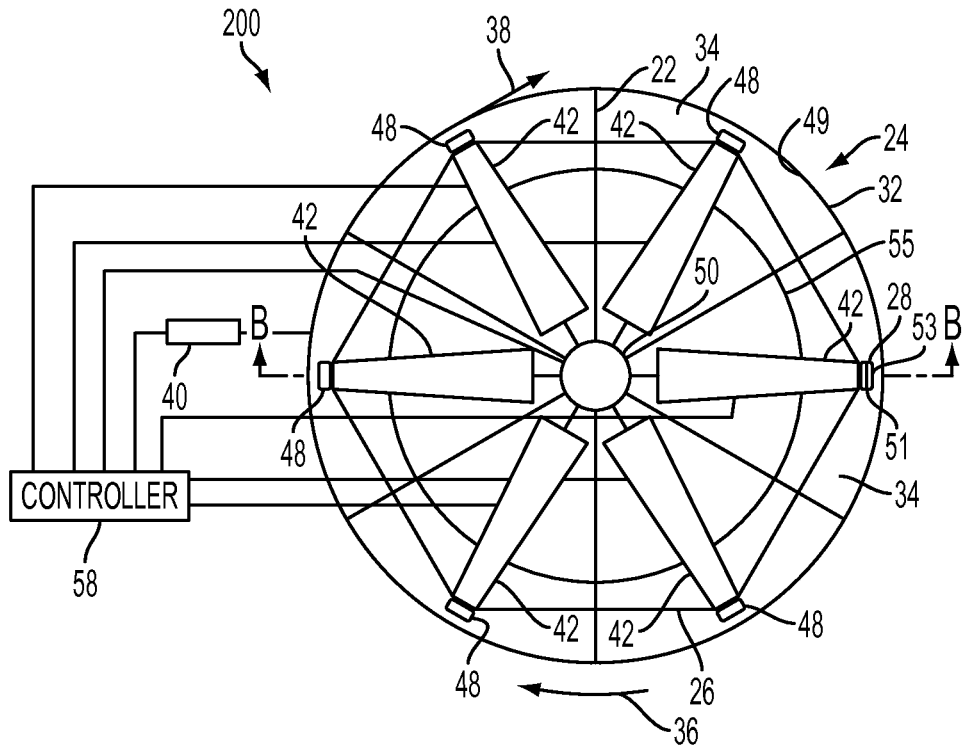
FIG. 4 is a top view of a second embodiment of the printer of FIG. 1.

FIG. 4 shows a second embodiment of the printer 200 for generating a three-dimensional object as viewed in a direction aligned with the axis 30. The second embodiment of the printer 200 is substantially similar to the first embodiment of the printer 100 illustrated in FIGS. 1-3 except that the wall 32 of the hollow member 24 is conical rather than cylindrical. The inner surface 34 of the wall 32 of the hollow member 24 extends between an upper edge 49 near the top of the printer 200 and an axially spaced lower edge 55 near the bottom of the printer 200. The diameter of the lower edge 55 is smaller than the diameter of the upper edge 49. The different diameters of the upper and lower edges 49, 55 position the inner surface 34 of the wall closer 32 to the axis 30 at the bottom of the printer 200 than at the top of the printer 200, thereby angling the inner surface 34 towards the axis 30.

Figure 5:
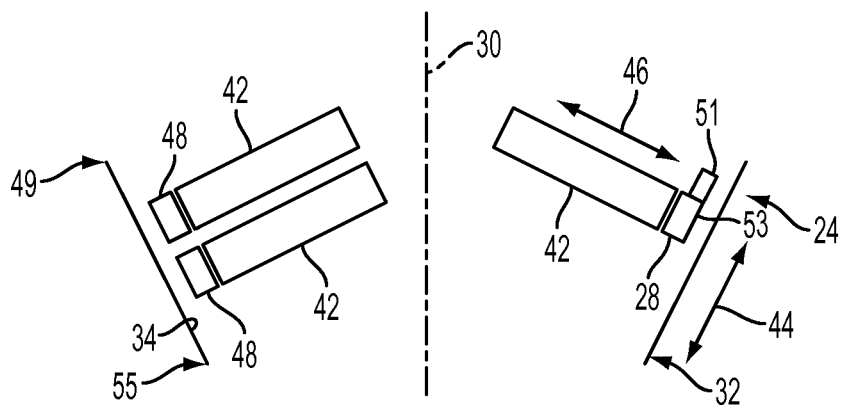
FIG. 5 is a partial section cut of the printer of FIG. 4 along line B-B showing an orientation of a rotating substrate and at least one printhead with respect to an axis of rotation of the substrate.

FIG. 5 shows a partial section cut of the second embodiment of the printer 200 of FIG. 4 along line B-B to further illustrate the orientation of the wall 32 of the hollow member 24 with respect to the axis 30. As shown in FIG. 5, the wall 32 of the hollow member 24 has an oblique orientation with respect to the axis 30. Although the wall 32 of the hollow member 24 is shown with a specific angle with respect to the axis 30, the wall 32 can have any angle between a parallel alignment and a perpendicular alignment with the axis 30. The second drivers 42 and the printheads 28, 48 are also positioned at an angle with respect to wall 32 that enables the printheads to be parallel with the slope of the wall 32. Although FIG. 5 shows the printer 200 with one partial-width printhead 28 to the right of the axis 30 and two cross-process-spaced, partial-width printheads 48 to the left of the axis 30, the printer 200 can include any number and combination of partial-width and full-width printheads to form the three-dimensional object. The printing of a three-dimensional object using the second embodiment of the printer 200 involves a balancing of the gravitational forces acting on the ejected material and the reaction forces resulting from the rotation of the material ejected onto the inner surface 34 of the hollow member 24. The balancing of the gravitational forces and the reaction forces is discussed in more detail below.

Figure 6:
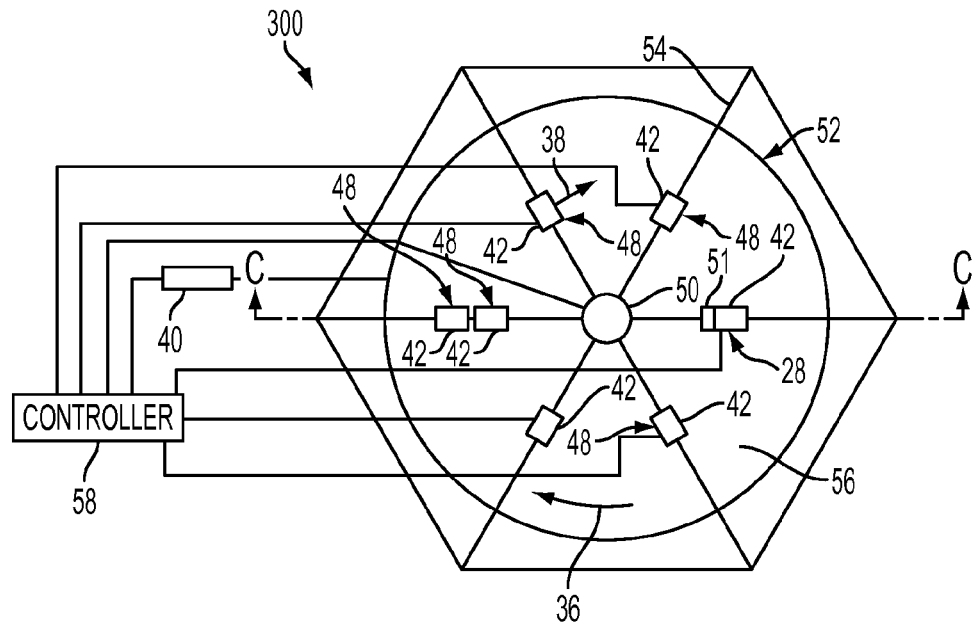
FIG. 6 is a top view of a third embodiment of the printer of FIG. 1.
Figure 7:
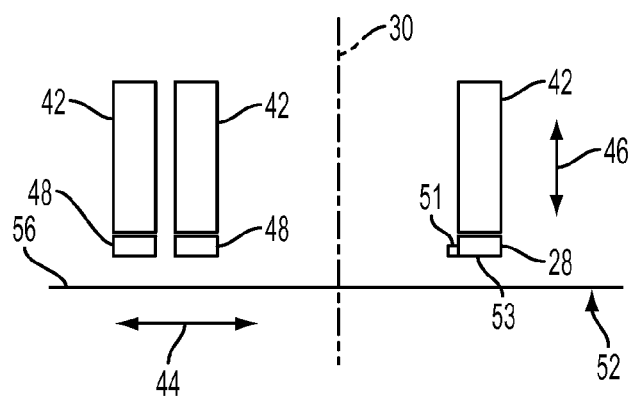
FIG. 7 is a partial section cut of the printer of FIG. 6 along line C-C showing an orientation of a rotating substrate and at least one printhead with respect to an axis of rotation of the substrate.

FIG. 6 shows a third embodiment of the printer 300 for generating a three-dimensional object. The printer 300 includes a base configured to support a rotatable circular member 52 and a frame 54 configured to support a first printhead 28 within an outer diameter of the circular member 52. The base is further configured to enable the circular member 52 to rotate relative to the frame 54 about an axis 30 (FIG. 7). The circular member 52 has at least one continuous top surface 56 or substrate that surrounds the axis 30 of the printer 300. A rotation of the circular member 52 about the axis 30 (in the direction of arrow 36) causes a portion of the top surface 56 of the circular member 52 to move past the first printhead 28 in a process direction 38. The placement of the first printhead 28 within the outer diameter of the circular member 52 enables the first printhead 28 to eject material onto the top surface 56 of the circular member 52 in a direction generally parallel with the axis 30. As used herein, the term "process direction" refers to a direction that is in the same direction as the tangential surface velocity of any given position on the top surface 56 of the circular member 52 as the circular member 52 is rotated about the axis 30.

The printer 300 further includes a first driver 40 operatively connected to the circular member 52 and a second driver 42 operatively connected to the first printhead 28. The first driver 40 is configured to rotate the top surface 56 of the circular member 52 past the first printhead 28. As discussed above with reference to FIGS. 1-3, the first driver 40 can be an electromechanical motor, a magnetic drive system, a pneumatic or hydraulic system, or any device or system configured to cause the circular member 52 to rotate about the axis 30.

The second driver 42 is configured to move the position of the first printhead 28 relative to the top surface 56 of the circular member 52. In one embodiment, the second driver 42 moves the first printhead 28 in a direction that is parallel with the top surface 56 of the circular member 52. In some embodiments, the second driver 42 moves the printhead in a cross-process direction 44 across a width of the top surface 56 of the circular member 52. As used herein, the term "cross-process direction" refers to a direction that is perpendicular to the process direction 38.

FIG. 7 shows a partial section cut of the third embodiment of the printer 300 of FIG. 6 along line C-C to illustrate the relative orientations of the elements of the printer 300. As shown in FIG. 7, the top surface 56 of the circular member 52 is perpendicular to the axis 30. The first printhead 28 in this embodiment is oriented in parallel with the axis 30. The second driver 42 is further configured to move the first printhead 28 in a z-direction 46 that is perpendicular to the top surface 56 of the circular member 52 and parallel to the axis 30. The movement of the first printhead 28 in the z-direction 46 enables the first printhead 28 to maintain a constant distance or gap away from the layer of ejected material most distant from the top surface 56 of the circular member 52. In another embodiment, the top surface 56 of the circular member 52 is configured to be lowered away from first printhead 28 to maintain the constant gap.

Similar to the first and second embodiments of the printer 100, 200, the third embodiment of the printer 300 can include one or more additional printheads 48 mounted within the outer diameter of the circular member 52 to enable the printheads to eject material onto the top surface 56 of the circular member 52. The first printhead 28 and the one or more additional printheads 48 can be full-width printheads, partial-width printheads, or any combination of full-width and partial-width printheads.

In one embodiment in which the first printhead 28 is a partial-width printhead, the first printhead 28 is translated parallel to the top surface 56 in the cross-process direction 44 to enable the first printhead 28 to eject material across the width of the circular member 52. In some embodiments, the translation of the first printhead 28 enables the printer 300 to form multiple contiguous or discrete perpendicular rings on the top surface 56 of the circular member 52. In other embodiments, the translation of the first printhead 28 enables the printer 300 to form a spiral or barber pole pattern on the top surface 56 of the circular member 52. In one embodiment having multiple printheads, the first printhead 28 and the one or more additional printheads 48 are spaced from one another in a circumferential direction defined by the rotation of the circular member 52. The multiple lines of printheads formed by the circumferential spacing enable the printheads 28, 48 to eject one or more different types of material with varying properties, such as color, conductivity, etc. The ejection of different types of material from the multiple lines of printheads enables the printer 300 to form complex parts by ejecting the various types of material on the same or different layers to build the three-dimensional object. In another embodiment including multiple printheads, the first printhead 28 and the one or more additional printheads 48 are positioned adjacent to one another such that the printheads 28, 48 are arranged to eject material seamlessly across the full width of the circular member 52 in the cross-process direction 44.

In one embodiment, the printer 300 has at least one multi-channel printhead that enables the printer 300 to eject one or more different types of materials from the multi-channel printhead onto the circular member 52. The multi-channel printhead in one embodiment is configured to eject one or more of a polylactic acid (PLA) material, a nylon material, an acrylonitrile butadiene styrene (ABS) material, and metal particles from a first channel onto the top surface 56 of the circular member 52. The multi-channel printhead is further configured to eject a removable support scaffold from a second channel onto the circular member 52 or onto one or more layers of material ejected onto the circular member 52. The ejected support scaffold in one embodiment is removable by one or more subtractive processes, including, but not limited to, abrading, cutting, and grinding. In another embodiment, the ejected support scaffold is removable via a chemical or thermal dissolution process.

Referring to FIG. 6 and FIG. 7, the printer 300 in one embodiment further includes at least one gap sensor 51 configured to generate a signal corresponding to a distance across a gap between the sensor 51 and the layer of ejected material most distant from the top surface 56 of the circular member 52. The sensor 51 in the embodiment shown in the figures is positioned flush with a print-side surface 53 of the first printhead 28 such that the signal generated by the sensor 51 corresponds to a distance across the gap between the first printhead 28 and the layer of material most distant from the top surface 56. The sensor 51 in another embodiment is spaced a known distance from the print-side surface 53 of the printhead. This arrangement enables the distance across the gap between the first printhead 28 and the layer of material most distant from the top surface 56 to be determined from the signal generated by the sensor 51 and the known spacing of the sensor 51 from the print-side surface 53. The gap sensor 51 in some embodiments is a contact sensor and in other embodiments is non-contact sensor.

Operation and control of the various subsystems, components and functions of the printer 100, 200, 300 are performed with the aid of a controller and memory. In particular, the controller monitors the velocity and position of the substrate and determines the timing of material ejection from the one or more printheads. The controller can be implemented with general or specialized programmable processors that execute programmed instructions. The controller is operatively connected to the memory to enable the controller to read instructions and to read and write data required to perform the programmed functions in the memory. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The controller 58 is operatively connected to the first printhead 28, the first driver 40, the second driver 42, and the encoder 50. The controller 58 is configured to execute programmed instructions stored in the memory to operate the three-dimensional printer 100, 200, 300 to generate a three-dimensional object. In the discussion below, the term "substrate" collectively refers to the inner surface 34 of the hollow member 24 (FIGS. 1-5) and the top surface 56 of the circular member 52 (FIG. 6 and FIG. 7), and the term "printer" collectively refers to the first (FIGS. 1-3), the second (FIG. 4 and FIG. 5), and the third (FIG. 6 and FIG. 7) embodiments of the printer 100, 200, 300 discussed above.

The controller 58 operates the first driver 40 to rotate the substrate 34, 56 at a constant angular velocity. In the first embodiment of the printer 100, all positions on the substrate 34, 56 are located at approximately the same distance from the axis 30, so the surface velocity at any position across the substrate 34, 56 is the same. In the second and third embodiments of the printer 200, 300, some positions on the substrate 34, 56 are located at different distances from the axis 30 than other positions, so the surface velocity across the substrate 34, 56 varies.

To accommodate the variable surface velocities across the substrate 34, 56, the controller 58 in one embodiment maintains a predetermined surface velocity at a predetermined distance from the axis 30. In this embodiment, positions on the substrate 34, 56 closer to the axis 30 than the predetermined distance have surface velocities that are slower than the velocity at the predetermined distance. In contrast, positions on the substrate 34, 56 further from the axis 30 than the predetermined distance have surface velocities faster than the velocity at the predetermined distance. In another embodiment, the controller 58 operates the first driver 40 to adjust the angular velocity of the substrate 34, 56 such that the portion of the substrate 34, 56 opposite a predetermined point of an operating printhead moves past the predetermined point at the predetermined surface velocity.

The controller 58 operates the first printhead 28 to eject material onto the substrate 34, 56 as the first driver 40 rotates the substrate 34, 56 at the constant angular velocity. The first printhead 28 can be operated selectively or continuously to build the layers of material to generate the three-dimensional object. The controller 58 uses the interpolated encoder signals from the monitoring system to selectively operate the printheads as a function of the angular position of the substrate 34, 56. The controller 58 also uses the interpolated encoder signals to adjust the angular velocity of the substrate 34, 56 to compensate for velocity variation across the substrate 34, 56. The image processing bit map in some embodiments can be modified to account for the different effective velocities at points of the operating printhead radially away from the predetermined point at which the controller 58 maintains the predetermined velocity.

The controller 58 in one embodiment selectively operates the first printhead 28 to eject material onto the substrate 34, 56 after one or more rotations of the substrate 34, 56 to enable hardening of the layer or layers of material ejected from the printhead. In another embodiment, the controller 58 operates the first driver 40 to temporarily stop or pause the rotation of the substrate 34, 56 to enable hardening or curing of the recently ejected material. In another embodiment, a laser sintering process is implemented to cure the recently ejected material before a subsequent layer is ejected from the first printhead 28.

The controller 58 fires the first printhead 28 at an approximately constant frequency driven by a digital image of the object to be formed on the substrate 34, 56. In one embodiment, the controller 58 operates the printhead at a frequency of approximately 39 kilohertz. In other embodiments, the controller 58 operates the printhead at a frequency that is greater or less than 39 kilohertz. The printhead operating frequency is typically selected with reference to a number of system parameters. These parameters include, but are not limited to, the complexity and/or size of the three-dimensional object to be produced, the size of the substrate and/or printer used to generate the three-dimensional object, and the properties and characteristic of the material or materials used to build the layers of the three-dimensional object.

The controller 58 identifies a distance of each layer of material from the first printhead 28 to adjust the position of the first printhead 28 in the z-direction 40. The controller 58 in one embodiment estimates the distance based on the position, the amount, and the properties of the material ejected onto substrate 34, 56. In another embodiment, the controller 58 identifies the distance of the layer of material most distant from the substrate 34, 56 with reference to the signal generated by the gap sensor 51. The gap sensor 46 in one embodiment is secured to the first printhead 28 such that movement of the printhead also moves the sensor 51. In other embodiments, the gap sensor 51 is secured to the frame 26, 54 such that the distance from the sensor 51 to the substrate remains constant. In all embodiments that implement the gap sensor 51, the position of the sensor 51 with reference to the substrate is calibrated as a reference position and stored in memory.

The controller 58 operates the second driver 42 with reference to the identified distance to move the first printhead 28 in the z-direction 46 to maintain a predetermined gap between the printhead and the layer of ejected material most distant from the substrate 34, 56. The predetermined gap enables the controller 58 to maintain consistent conditions for the printer 100, 200, 300 to form the three-dimensional object. The predetermined gap enables the controller 58 to eject the material from the first printhead 28 with a predictable flight time from the first printhead 28 to the substrate 34, 56 or to existing layers of material. The predetermined gap also enables the controller 58 to account for air entrained from the rotating object. The predetermined gap further prevents a collision from occurring when the material already ejected onto the substrate is moved past the first printhead 28. In one embodiment, the second driver 42 is embodied as a stepper motor that is operated by the controller 58 with reference to one or more of the interpolated encoder output and the gap sensor 51. The motion of the printhead in the z-direction 46 is smooth or continuous during the rotation of the substrate 34, 56 in some embodiments. In other embodiments, the motion of the printhead in the z-direction 46 is in discrete movements, for example, a discrete translation is made after each completed rotation of the substrate 34, 56 past the printhead.

The controller 58 in some embodiments operates the second driver 42 to move the first printhead 28 relative to the substrate 34, 56 in the cross-process direction 44. The cross-process movement enables the printhead to eject material at higher cross-process resolutions than possible with printheads that are fixed in the cross-process direction 44. In some embodiments, the motion of the printhead in the cross-process direction 44 is smooth or continuous during the rotation of the substrate 34, 56. The motion of the printhead in the cross-process direction 44 in other embodiments is in discrete movements, for example, a discrete translation is made after each completed rotation of the substrate 34, 56 past the motion-capable printhead. In yet further embodiments, the motion of the printhead in the cross-process direction 44 includes a combination of continuous or spiral movements and discrete movements such that the printhead forms a uniform continuous ejection along the width of the hollow member 24.

The substrate orientations of the various printer embodiments, gravity, and the centripetal forces acting on the ejected material are considered when generating the three-dimensional object to avoid object defects, such as feature shift or sag, or the misdirection of ejected material from the printers 100, 200, and 300. The consideration of centripetal force is useful because centripetal force changes as additional layers of material are deposited onto the substrate 34, 56. In some embodiments, the controller 58 can implement software mapping processes to adjust the pixel positions and/or the timing of the material ejection from the printhead to compensate for object feature sag or misplacement due to the various forces. A finite element model calculation of the object image file is performed in some embodiments to identify adjustments to avoid feature defects. A rollover calculation can also be performed to ensure the object does not tip over during its formation.

The frictional force between the substrate 34, 56 and the portions of the ejected material adjacent to the substrate 34, 56 is also considered when generating the three-dimensional object to ensure that the object does not slip on the substrate 34, 56 due to gravity or the centripetal force. In some embodiments, slipping is avoided by configuring the substrate 34, 56 with a high-friction surface. However, a high-friction surface can increase the difficulty in removing the completed three-dimensional object from the substrate 34, 56.

Figure 8:
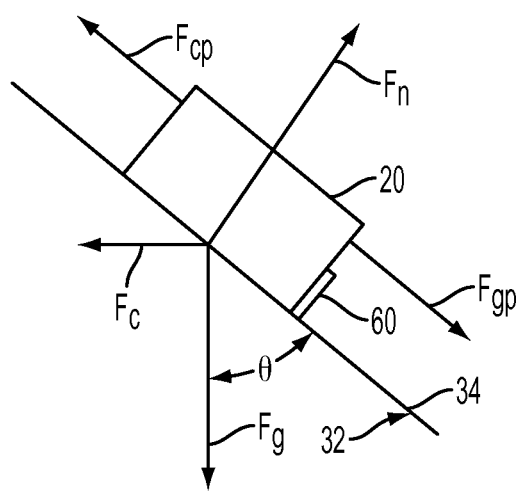
FIG. 8 is a schematic view of the forces acting on a three-dimensional object formed in the second embodiment of the printer of FIG. 4.

FIG. 8 illustrates the various forces acting on a generic object 20 as the object is resting on the substrate 34, 56 of the second embodiment of the printer 200 (FIG. 4 and FIG. 5). The figure shows the substrate 34, 56 having an arbitrary angle ($\theta$) with respect to a vertical axis parallel with gravity. The force of gravity ($F_g$) points along the vertical and is decomposed into a vector in the plane of the substrate ($F_{gp}$), where $F_{gp}=F_g \cos \theta$, and a vector perpendicular to the plane of the substrate ($F_{gn}$), where $F_{gn}=F_g \sin \theta$. The centrifugal pseudo-force ($F_c$) points in a direction perpendicular to the axis 30 and is decomposed into a vector pointing away from the axis 30 in the plane of the substrate ($F_{cp}$), where $F_{cp}=F_c \sin \theta$, and a vector perpendicular to the plane of the substrate ($F_{cn}$), where $F_{cn}=F_c \cos \theta$. The sum of the normal force component of gravity ($F_g n$) acting on the object and the normal force component of the centrifugal pseudo-force ($F_{cn}$) acting on the object equals the normal force ($F_n$) of the object on the substrate, where $F_n=F_{gn}+F_{cn}$.

In some embodiments, the printer 100, 200, 300 is configured to balance the forces acting on the object such that the static friction between the object and the substrate 34, 56 is sufficient to hold the object in place as it is rotated about the axis 30. Table 1 shows an example of design parameters used with the second embodiment of the printer 200 to approximately balance the forces acting on an objected generated by the printer 200.

TABLE 1

| | | |
|---|---|---|
| Velocity | 2.54 m/s | 500 ft/min |
| Radius | 0.75 m | 29.53 in |
| Angular velocity | 3.39 rad/s | |
| Centripital acceleration | 8.6 m/s² | |
| Gravitational acceleration | 9.8 m/s² | |
| Theta ($\theta$) | 0.54 rad | 30.9 deg |
| Gravitational component along substrate | 8.41 | |
| Centrifugal component along substrate | 4.42 | |
| Normal force | 12.42 | |
| Static friction coefficient | 0.45 | |
| Net acceleration in plane of substrate | 3.98 | positive = down and in negative = up and out |
| Counteracting friction | 5.59 | |
| Cross-process part size | 0.1 m | |
| Velocity of bottom edge | 2.45 m/s | |
| Velocity of top edge | 2.63 m/s | |
| Percent velocity deviation | 7% | |

As shown in Table 1, the substrate 34 is rotated to have a surface velocity of 500 ft/min. The static friction coefficient of 0.45 indicated in the table is the approximate midpoint for the static friction coefficient range for a polyester thermoplastic material ejected onto a steel substrate. In one embodiment, an industry-standard high-friction coating is applied to the substrate to increase the static friction coefficient to an approximate range of 0.5 to 0.6 if desired. The substrate 34 in the system described in Table 1 has a radius of 30 inches from the axis 30 of the printer 200. To balance the gravitational and centrifugal forces acting on the ejected material, the angle of the substrate ($\theta$) is approximately 30 degrees from the vertical. The angled substrate introduces a velocity difference across the surface of the object formed by the printer 200. For an object having a cross-process length of 0.1 m, an approximate velocity difference of 7% exists from the bottom of the object, closest to the axis 30, to the top of the object, farthest from the axis 30. In some embodiments, the angle of the substrate ($\theta$) is decreased by decreasing the radius of the substrate from the axis 30.

Table 2 shows an example of design parameters used with the first embodiment of the printer 100 to approximately balance the forces acting on an objected generated by the printer 100.

TABLE 2

| | | |
|---|---|---|
| Velocity | 2.54 m/s | 500 ft/min |
| Radius | 0.25 m | 9.84 in |
| Angular velocity | 10.16 rad/s | |
| Centripetal acceleration | 25.8 m/s² | |
| Gravitational acceleration | 9.8 m/s² | |
| Theta | 0 rad | 0 deg |
| Gravitational component along substrate | 9.8 | |
| Centrifugal component along substrate | 0 | |
| Normal force | 25.81 | |
| Static friction coefficient | 0.45 | |
| Net acceleration in plane of substrate | 9.8 | positive = down and in negative = up and out |
| Counteracting friction | 11.61 | |
| Cross-process part size | 0.1 m | |
| Velocity of bottom edge | 2.54 msec | |
| Velocity of top edge | 2.54 msec | |
| Percent velocity deviation | 0% | |

As shown in Table 2, the substrate 34 is rotated to have a surface velocity of 500 ft/min. The static friction coefficient of 0.45 indicated in the table is the approximate midpoint for the static friction coefficient range for a polyester thermoplastic material ejected onto a steel substrate. The size of the first embodiment of the printer 100 is typically smaller than that of the second embodiment of the printer 200 to maximize the centrifugal force that acts on the object. The substrate 34 is sized to ensure that the centrifugal force that acts on the rotating object is sufficient to generate a counteracting friction force that is greater than the gravitational force that acts on the object. As shown in Table 2, the substrate 34 of the first embodiment of the printer 100 is sized with a radius of approximately 9.84 inches from the axis 30 of the printer 100.

Although the first embodiment of the printer 100 is generally smaller than the other embodiments of the printer 200, 300 disclosed herein, an object formed by the first embodiment of the printer 100 does not experience a velocity differential across its surface since all positions of the substrate 34 are equally spaced from the axis 30. The substrate 34 of the printer 100 described in Table 2 has substantial surface area for object production notwithstanding its smaller size as compared to the other embodiments. In one embodiment, for example, the first printhead 28 of the printer 100 ejects material across approximately 3 inches of the substrate 34 in the cross-process direction 44. In a system having a substrate 34 with a 10-inch radius, the printhead can eject material onto the substrate 34 over a surface area of approximately 1.25 square feet, which is comparable to existing production systems. The addition of one or more further printheads 48 adjacent to the first printhead 28 in the cross-process direction 44 enables a scalable architecture having the potential to form a large number of discrete objects in a single batch.

Table 3 shows an example of design parameters used with the third embodiment of the printer 300 to approximately balance the forces acting on an objected generated by the printer 300.

TABLE 3

| | | |
|---|---|---|
| Velocity | 1.65 m/s | 325 ft/min |
| Radius | 2 m | 78.74 in |
| Angular velocity | 0.83 rad/s | |
| Centripetal acceleration | 1.4 m/s^2 | |
| Gravitational acceleration | 9.8 m/s^2 | |
| Theta | 1.57 rad | 90 deg |
| Gravitational component along substrate | 0 | |
| Centrifugal component along substrate | 1.36 | |
| Normal force | 9.8 | |
| Static friction coefficient | 0.35 | |
| Net acceleration in plane of substrate | −1.36 | positive = down and in negative = up and out |
| Counteracting friction | 3.43 | |
| Cross-process part size | 0.1 m | |
| Velocity of bottom edge | 1.61 m/s | |
| Velocity of top edge | 1.69 m/s | |
| Percent velocity deviation | 5% | |

As shown in Table 3, the substrate 56 is rotated to have a surface velocity of 325 ft/min. The static friction coefficient of 0.35 indicated in the table is the approximate midpoint for the static friction coefficient range for a polyester thermoplastic material ejected onto a steel substrate. The size of the third embodiment of the printer 300 is typically larger than that of the other embodiments of the printer 100, 200 to minimize the centrifugal force that acts on the object. The substrate 56 is sized to ensure that the counteracting friction force that results from gravity alone acting on the object is sufficient to overcome the centrifugal force that acts on the object as the substrate 56 rotates. As shown in Table 3, the substrate 56 of the third embodiment of the printer 300 is sized with a radius of approximately 78.74 inches from the axis 30.

The surface velocity of the substrate 56 of the third embodiment of the printer 300 is typically less than that of the other embodiments of the printer 100, 200 to minimize the centrifugal force that acts on the object. The velocity difference across the surface of the object formed by the printer 300 is reduced by increasing the radius of the substrate 56 from the axis 30. As shown in Table 3, the large-radius substrate 56 produces an approximately 5% velocity deviation across an object having a cross-process length of 0.1 m.

Figure 9:
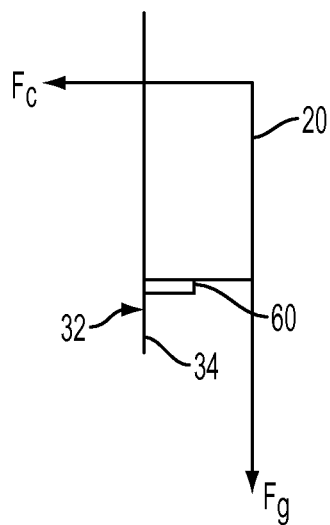
FIG. 9 is a schematic view of the forces acting on a three-dimensional object formed in the first embodiment of the printer of FIG. 1.

In one embodiment, the printer 100, 200 is configured as a gravitational-force-biased system in which the gravitation force that acts on the object exceeds the counteracting friction force that acts between the object and the substrate 34. In each of the second embodiment of the printer 200 (FIG. 8) and the first embodiment of the printer 100 (FIG. 9), the substrate 34 includes a ledge 60 that is configured to interact with the ejected material that is adjacent to the ledge 60. The ledge 60 resists the force of the object 20 pressing against the ledge 60 and prevents the object 20 from sliding across the substrate 34. Although the centrifugal force that acts on the object 20 does not need to exceed the gravitational force that acts on the object 20, the centrifugal force needs to be sufficiently strong to prevent the object 20 from rotating over the ledge 60.

In one embodiment, the printer 100, 200 includes a transport mechanism 62 (FIG. 1) configured to receive one or more three-dimensional objects 20 formed by the printer 100, 200 and move the objects 20 from the printer 100, 200. In this embodiment, the controller 58 operates the first driver 40 to decrease the angular velocity of the substrate 34 such that the gravitational force that acts on the completed object 20 exceeds the centrifugal force that acts on the object and the object 20 slides across the substrate 34 onto the transport mechanism 62. In embodiments in which the printer includes the ledge 60 to support object during object formation, the ledge 60 is configured to be movable with respect to the substrate 34 so the completed object can slide past the ledge 60 and onto the transport mechanism 62.

In some embodiments of the printer 100, the orientation of the axis 30 is oblique with respect to gravity. For example, a horizontal orientation of the axis 30 in one embodiment enables the one or more printheads of the printer 100 to eject material downwardly in a direction substantially parallel with gravity. In this embodiment, the considerations used to ensure that the object remains on the substrate during formation must account for the varying direction of gravity acting on the object as the object rotates about the axis 30. One such consideration includes selecting an appropriate speed to ensure the object remains on the substrate when the maximum gravitational component of gravity acts on the object to separate the object from the substrate.

In an alternative embodiment of the printers 100, 200, 300, one or more printheads are configured to rotate past a stationary substrate to form the three-dimensional object. In this alternative embodiment, the one or more printheads are supported on a movable frame configured to rotate relative to the substrate. A material supply is provided along the axis of the printer and material supply lines are provided to deliver ink from the material supply to the one or more printheads. The controller operates at least one driver to rotate the moveable frame along with the material supply and the material supply lines about the axis. The controller operates the one or more printheads to eject material onto the substrate to build the layers of material and form the three-dimensional object. The controller operates additional drivers, similar to the drivers discussed above with reference to the first, second, and third embodiments of the printer 100, 200, 300, to move the one or more printheads relative to the substrate as the printheads are rotated past the substrate.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional printer comprising:
a hollow member having a wall and the hollow member includes a ledge movable between a first position and a second position;
a first printhead mounted within the hollow member to enable the printhead to eject material onto an inner surface of the wall;
a first driver operatively connected to the hollow member to rotate the wall of the hollow member about the printhead; and
a controller operatively connected to the first printhead and the first driver, the controller being configured to operate the first driver to rotate the hollow member and to operate the first printhead to eject material onto the inner surface of the wall and build layers of material on the wall as the wall rotates about the first printhead and the controller is configured to adjust a rotation of the hollow member to enable gravitational force to cause the layers of material on the wall to move relative to the hollow member and the ledge in the first position prevents the layers of material on the wall from moving relative to the hollow member due to the gravitational force and the ledge in the second position enables the layers of material on the wall to move relative to the hollow member due to gravitational force.

2. The three-dimensional printer of claim 1, further comprising:
a second driver operatively connected to the first printhead to move the first printhead relative to the wall of the hollow member, the controller being operatively connected to the second driver and further configured to operate the second driver to move the first printhead from a first position to a second position.

3. The three-dimensional printer of claim 2, the second driver being further configured to move the first printhead from the first position to the second position in a direction perpendicular to the wall of the hollow member.

4. The three-dimensional printer of claim 3, the controller being further configured to operate the second driver to move the first printhead from the first position to the second position in one or more of (i) a continuous motion during a rotation of the hollow member and (ii) at least one discrete movement after one or more rotations of the hollow member.

5. The three-dimensional printer of claim 2, further comprising:
a sensor configured to generate a signal corresponding to a distance of a gap between the sensor and a layer of ejected material most distant from the inner surface of the hollow member, the controller being operatively connected to the sensor and further configured to:
identify a distance from the sensor to the layer of ejected material most distance from the inner surface of the hollow member with reference to the signal generated by the sensor; and
operate the second driver to move the first printhead in a direction perpendicular to the inner surface of the hollow member with reference to the identified distance to maintain a predetermined gap between the first printhead and the layer of ejected material most distant from the inner surface of the hollow member.

6. The three-dimensional printer of claim 2, the second driver being further configured to move the first printhead from the first position to the second position in a direction parallel to the wall of the hollow member.

7. The three-dimensional printer of claim 6, the controller being further configured to operate the second driver to move the first printhead from the first position to the second position in one or more of (i) a continuous motion during a rotation of the hollow member and (ii) at least one discrete movement after one or more rotations of the hollow member.

8. The three-dimensional printer of claim 1, wherein the wall of the hollow member forms an angle that is parallel to an axis about which the driver rotates the hollow member.

9. The three-dimensional printer of claim 1, wherein the wall of the hollow member forms an angle that is oblique to an axis about which the first driver rotates the hollow member.

10. The three-dimensional printer of claim 1, further comprising:
a position encoder operatively connected to the hollow member, the position encoder being configured to generate an alternating signal as a function of a rotational position of the hollow member, the controller operatively connected to the position encoder and further configured to:
sum a number of integral cycles and fractional cycles of the alternating signal that are generated over a predetermined period,
identify a rotational velocity of the hollow member with reference to integral and fractional cycles of the alternating signal over the predetermined period,
identify a position of the hollow member with reference to the integral and fractional cycles of the alternating signal and a conversion factor, and
operate the first printhead to eject the material onto the inner surface of the wall with reference to the identified rotational velocity and the identified position of the hollow member.

11. The three-dimensional printer of claim 10, the controller being further configured to:
adjust a rotation of the hollow member with reference to the identified rotational velocity and the identified position of the hollow member.

12. The three-dimensional printer of claim 1, further comprising:
a second printhead mounted within the hollow member to enable the second printhead to eject material onto the inner surface of the wall, the controller being operatively connected to the second printhead and configured to operate the second printhead to eject material onto the inner surface of the wall.

13. The three-dimensional printer of claim 12, wherein the second printhead is spaced from the first printhead in a circumferential direction defined by the rotation of the hollow member.

14. The three-dimensional printer of claim 12, wherein the second printhead is positioned adjacent to the first printhead such that the first printhead and the second printhead extend in a direction perpendicular to the rotation of the wall.

15. The three-dimensional printer of claim 1, the controller being further configured to:
selectively operate the first printhead to eject material onto the inner surface of the hollow member after one or more rotations of the hollow member to enable hardening of a layer of ejected material on the inner surface of the hollow member.

* * * * *